United States Patent [19]
Robinette, Jr.

[15] 3,706,791
[45] Dec. 19, 1972

[54] SURFACE ACTIVE SULFONATES AND PROCESS OF PREPARING SAME BY THE REACTION OF ALPHA OLEFINS AND BISULFITE

[72] Inventor: Hillary Robinette, Jr., Philadelphia, Pa.

[73] Assignee: Robinette Research Laboratories, Inc., Berwyn, Pa.

[22] Filed: March 18, 1970

[21] Appl. No.: 20,814

[52] U.S. Cl. ................................................260/513 B
[51] Int. Cl. ..............................................C07c 143/02
[58] Field of Search ....................................260/513 B

[56] References Cited

UNITED STATES PATENTS

| | | | |
|---|---|---|---|
| 3,541,140 | 11/1970 | Murphy et al. | 260/513 B |
| 3,356,717 | 12/1967 | Furrow | 260/513 B |
| 3,479,397 | 11/1969 | Norton et al. | 260/513 B |
| 3,522,297 | 7/1970 | Norton et al. | 260/513 B |

Primary Examiner—Daniel D. Horwitz
Attorney—McClure, Weiser & Millman

[57] ABSTRACT

Surface active alkane sulfonates prepared by agitating an aqueous solution of a bisulfite and an alcoholic solution of an olefin of seven to 20 carbon atoms or mixtures thereof in the presence of a small quantity of a diazo or azobis compound such as azobisisobutyronitrile, azobis-($\alpha$, $\gamma$-dimethylvaleronitrile) or diazoaminobenzene serving as a free radical-forming initiating catalyst. During the course of the reaction, a dispersion of a two phase system is maintained and the temperature of the reaction is kept below the boiling point of the alcohol used. The products are hydrolysis and heat stable, have excellent color and are useful as textile softeners, textile anti-static agents, emulsifying agents, wetting agents, dyeing assistants, bio-degradable detergents, lubricants, dispersing agents, and the like. The products can be employed as the clear reaction mixture at the end of the reaction or as a solid material after evaporation of the alcohol or the alcohol and water therefrom.

18 Claims, No Drawings

SURFACE ACTIVE SULFONATES AND PROCESS OF PREPARING SAME BY THE REACTION OF ALPHA OLEFINS AND BISULFITE

This invention relates to surfactants and a process of preparing them by the interaction of water soluble bisulfites with olefinic hydrocarbons of from seven to 20 carbon atoms.

The addition of sodium bisulfite to unsaturated organic compounds has long been known. One of the early patents in which this reaction is used is Jaeger patent 2,028,091 which described the addition of sodium bisulfite to esters of maleic acid. The reaction is carried out by heating an aqueous alcoholic solution of sodium bisulfite and the maleic acid ester in a closed vessel. The patent of Werntz 2,318,036 describes the addition of bisulfite to unsaturated hydrocarbons utilizing hydrogen peroxide and ascaridole as oxidizing agents. The U.S. Pat. No. 3,336,210 of Furrow discloses the production of organic sulfonates by reacting alkenes with bisulfites in a solvent system having low absorbtivity for radiation and carrying out the reaction in the presence of electromagnetic radiation in the range of 1,000 to 8,000 angstroms with expensive promoters and certain selected dyes. The U.S. Pat. No. 3,084,186 of Clippinger describes the addition of bisulfites to olefins in a system requiring unusual, difficult and limiting controls on the method by which the ingredients are combined. The U.S. Pat. No. 2,504,411 of Harman discloses the necessity of maintaining certain molar ratios of bisulfite ions to olefins and of olefins to certain organic peroxide initiators and the importance of controlling the reaction temperature in rather narrow limits and pairing up the initiators with a specific solvent to obtain good yields of the alpha olefin sulfonates.

The primary object of this invention is to provide a process of producing surfactants by the interaction of water soluble bisulfites and olefins containing from seven to 20 carbon atoms, either in pure form or in admixture, which possesses operating advantages over the aforementioned prior art and which can be readily and effectively carried out under ordinary plant conditions.

Another important object of the invention is to provide surfactants produced by the addition of water soluble bisulfites to alpha olefins containing seven to 20 carbon atoms or admixtures of olefins, whose major components are normal alpha monoolefins, which are hydrolysis and heat stable and have excellent color and are useful as textile softeners, textile anti-static agents, emulsifying agents, wetting agents, dyeing assistants, biodegradable detergents, lubricants and dispersing agents.

These and other objects and advantages of the invention will become more apparent as the following description proceeds.

The process comprises reacting olefins, straight or branch chain, containing at least one double bond preferably in the 1 or alpha position, of seven to 20 carbon atoms, either pure or in admixture, with a water soluble bisulfite $MHSO_3$ in which M is an alkali metal such as sodium, potassium, lithium or cesium, an alkaline earth metal such as calcium, barium or strontium, ammonium, or an amine radical such as dimethylamine, dimethylaniline, pyridine, monoethanolamine, or triethanolamine, etc.

The process is carried out with a free radical-forming initiating catalyst of the diazo or azobis type, such as azobisisobutyronitrile, azobis ($\alpha,\gamma$-dimethylvaleronitrile), and diazoaminobenzene and in an aqueous-solvent medium using a solvent for the olefin which is nonreactive to bisulfite, particularly the alcohols, such as methanol, ethanol, isopropanol or tertiary butanol. While the reaction can be carried out at normal temperatures and in complete darkness, it is accelerated at increased temperatures. The temperatures preferred are those approaching the boiling point of the olefin solvent employed, which in the case of the aforementioned alcohols is in the range of about 64.7° C to about 82.5° C. A reflux condenser can be associated with the reaction vessel if it is anticipated that the temperature will possibly exceed the boiling point of the solvent.

Contrary to U.S. Pat. No. 3,084,186 in which the rate of addition of the bisulfite to the olefin is strictly controlled and to U.S. Pat. No. 2,504,411 in which may factors are controlled, among them the temperature within narrow limits and the ratios of initiators, solvents, and olefins, it has been found that the present process can be carried out efficiently and high yields can be obtained by charging all of the ingredients into the reaction vessel at the same time without undue regard for solvent selection, solvent concentration, time or temperature.

The following are illustrative but non-limitative examples of the invention.

EXAMPLE 1

Into a 500 ml three-necked flask equipped with a reflux condenser, a Teflon-bladed glass agitator and a thermometer, 31.2 g of sodium metabisulfite, previously dissolved in 85 ml of water was charged. There was then added 170 ml isopropyl alcohol, 40.2 g of alpha olefin Oronite $C_{15}$—$C_{18}$ and 1 gram of Vazo 64 (duPont azobisisobutyronitrile). The agitation was started and the temperature was gradually raised from 24° C to 73° C over a period of 2 hours. Heating and agitation continued for four hours. A clear water-white solution was obtained which on dilution with water gave a foaming soap-like solution. On evaporation of the alcohol and water a white, soap-like, water-soluble powder resulted.

Oronite $C_{15}$—$C_{18}$ is a product of Chevron Chemical Company having an average molecular weight = 228; a composition as follows: alpha olefins = 89 wt %, internal olefins = 7 wt %, diolefins = 2 wt %, saturates = 2 wt %; and a carbon distribution as follows: $C_{14}$ = 1 wt %, $C_{15}$ = 27 wt %, $C_{16}$ = 29 wt %, $C_{17}$ = 28 wt %, $C_{18}$ = 14 wt % and $C_{19}$ = 1 wt %.

Vazo 64, a vinyl polymerization catalyst sold by the duPont company, is azobisisobutyronitrile.

EXAMPLE 2

Into a 500 cc three-necked flask equipped with a reflux condenser, a glass agitator with a Teflon blade and a thermometer there was placed 40.2 grams of Oronite $C_{15}$—$C_{18}$, 170 ml of isopropyl alcohol, 0.3 g azobisisobutyronitrile (Vazo 64) and 31.2 g sodium bisulfite previously dissolved in 85 ml of water. After all the ingredients were charged to the flask, the agitator was started and the temperature gradually raised from 26° C to 70° C in 1-½ hours with the agitator speed at 540 rpm. After 2-½ hours at 70° C, the previously yellow immiscible layers were now reacted to provide a completely, brilliantly clear, water-white, completely water-soluble foaming solution. Heating was continued for a total of 8 hours and the material cooled and transferred to a bottle. On standing it set up to a water-soluble white paste.

EXAMPLE 3

Using the same apparatus as in Example 2, the charge to the flask was 40.4 grams of Oronite $C_{11}$—$C_{14}$, 170 ml of isopropyl alcohol, 0.3 g of azobisisobutyronitrile (Vazo 64) and 41.6 g sodium bisulfite previously dissolved in 85 ml of water. The temperature was gradually raised from 25° C to 74° C with stirring at 540 rpm over a period of 3 hours. Heating was continued for a period of 12 hours. The alcohol was distilled from the reaction mixture and the clear water-white resulting liquid was transferred to a flask where it set up to a white semi-soft, completely water-soluble, highly-foaming solid.

Oronite $C_{11}$—$C_{14}$ is a product of Chevron Chemical Company having an average molecular weight = 176; a composition as follows: alpha olefins = 92 wt %, internal olefins = 3 wt %, diolefins = 4 wt % and saturates = 2 wt %; and a carbon distribution as follows: $C_{10}$ = 2 wt %, $C_{11}$ = 23 wt %, $C_{12}$ = 23 wt %, $C_{13}$ = 24 wt %, $C_{14}$ = 25 wt % and $C_{15}$ = 3 wt %.

EXAMPLE 4

The same procedure and ratio of ingredients were used as in Example 3 except that methanol was substituted for the isopropyl alcohol and the reaction was carried out at a temperature between 45° C and 55° C.

EXAMPLE 5

The same procedure and ratio of ingredients were carried out as in Example 3 except that tertiary butyl alcohol was substituted for the isopropyl alcohol and the reaction was carried out at a temperature between 60° C and 72° C.

EXAMPLE 6

The same procedure and ratio of ingredients were used as in Example 1 except that Vazo 52, a product of the duPont Company was substituted for Vazo 64. Vazo 52, a vinyl polymerization catalyst, is azobis ($\alpha,\gamma$-dimethylvaleronitrile).

EXAMPLE 7

Utilizing the same procedure and apparatus as in Example 2, 34.3 g of tetradecene, a $C_{14}$ product of Gulf Refining Company comprising normal olefins = 92.6 wt % minimum, monoolefins = 98.5 wt % minimum having a carbon number as $C_{14}$ of 96 wt % minimum and having a distillation range of 5% at 240° C and 95% at 255° C, 170 ml of isopropyl alcohol, 0.3 g of azobisisobutyronitrile (Vazo 64) and 31.2 g of sodium bisulfite previously dissolved in 85 ml of water were charged to a 500 cc three-necked flask. The molar ratio of olefin to bisulfite was substantially 1:1. Over a period of 1 hour the temperature was raised from 23° C to 75° C at which time the two immiscible layers became completely crystal-clear and water-white, and after one additional hour the reaction was completed providing an alcoholic aqueous solution completely soluble in water showing excellent foaming properties over a wide range of concentrations.

EXAMPLE 8

The procedure of Example 7 was carried out in which 39.1 g of hexadecene was substituted for the tetradecene. Hexadecene, a $C_{16}$ product of Gulf Refining Company, comprises: normal olefins = 90.6 wt % minimum, monoolefins = 98.5 wt % minimum, having a carbon number as $C_{16}$ = 95 wt % minimum and a distillation range of 5% at 270° C and 95% at 300° C. As in Example 7, molar ratio of the olefin to the bisulfite was substantially 1:1. The product obtained was similar to that obtained in Example 7.

EXAMPLE 9

The procedure of Example 7 was followed except that 44.1 g of octadecene was substituted for the tetradecene. Octadecene, a $C_{18}$ product of Gulf Refining Company comprises: normal olefins = 88.6 wt % minimum, monoolefins = 98.5 wt % minimum, a carbon number as $C_{18}$ = 90.4 wt % minimum and a freezing point of 18° C. As in the previous Examples 7 and 8, the molar ratio of the olefin to the bisulfite was substantially 1:1. On standing the product crystallized to a white paste and had properties similar to the products of Examples 7 and 8.

EXAMPLE 10

The procedure of Example 1 was followed except that 40.4 g Oronite $C_{10}$ was substituted for the Oronite $C_{15}$—$C_{18}$. Oronite $C_{10}$ is a product of Chevron Chemical Company sold under the following specification: straight chain = 90 wt % minimum, diolefin = 6 wt % maximum, alpha olefin = 87 wt % minimum and a chain length of $C_9$ = 5 wt % maximum, $C_{10}$ = 90 wt % minimum and $C_{11}$ = 5 wt % maximum. The product used in this example analyzed out as straight chain = 91.2 wt %, diolefin = 0.8 wt %, alpha olefin = 93 wt % and $C_{11}$ = 1.4 wt %. The product obtained was completely soluble in water, resulting in high foaming solution suitable for use, for example, in shampoos, detergents and the like.

EXAMPLE 11

The procedure of Example 1 was carried out using tertiary butyl alcohol in one run and ethyl alcohol in another run instead of isopropanol with the same results.

EXAMPLE 12

The procedure of Example 3 was carried out using tertiary butyl alcohol in one run and ethyl alcohol in another run instead of isopropanol with the same results.

EXAMPLE 13

The procedure of Example 1 was carried out with about 35.2 g of potassium bisulfite, $KHSO_3$, instead of sodium bisulfite with the same results.

EXAMPLE 14

The procedure of Example 1 was carried out with about 31.7 g of ammonium bisulfite, $NH_4HSO_3$, with the same results.

EXAMPLE 15

The procedure of Example 1 was carried out with about 1 g of diazoaminobenzene with the same results.

EXAMPLE 16

The same procedure as Example 1 was carried out except that about 64.6 g of calcium bisulfite, $Ca(HSO_3)_2$, was substituted for the sodium bisulfite with substantially the same results.

EXAMPLE 17

The same procedure as Example 1 was carried out except that about 45.4 g of monoethanolamine bisulfite was substituted for the sodium bisulfite with substantially the same results.

The reaction is carried out by agitating an aqueous solution of the bisulfite with an alcoholic solution of the olefin at a temperature preferably somewhat less than the boiling point of the solvent and for a time sufficient to complete the bisulfite addition in the presence of the diazo or azobis free radical-forming initiating catalyst. The temperature, order of addition of the reactants and their ratio are not critical and as little as 0.01% of the catalyst based on the weight of olefin can be used. The amount of catalyst for reasons primarily of economics should not exceed about 1% based on the weight of olefin.

All the reactants can be introduced into the reactor at one time and by maintaining a concentration of the alcohol and water such that an excess of alcohol is not used or an insufficient amount of water is used for dissolving the bisulfite, a two-layer or two-phase rather than a three-phase system is provided. By agitating the two-phase system in which the catalyst acts at the interface, a turbid-appearing dispersion of the phases is maintained and shortly before the reaction is completed, a single clear phase results. The products of the instant invention encompass this clear solution, or a solid material resulting from the evaporation or distillation of the alcohol from the clear solution or a solid material resulting from the removal of both the alcohol and the water.

Thus, the invention provides a simplified process which can be carried out at temperatures in the range suitable for atmospheric pressure operation utilizing a minimum amount of initiating catalyst and agitation to maintain a disperse system of the two-phases during the course of the reaction, which generally runs from 2 to 20 hours. Good yields of surface active alkane sulfonates are obtained. The use of the azo compounds as catalysts renders the process valuable and economical and it is postulated that this is probably due to the fact that their tendency to react with the bisulfite is minimal and therefore remain to provide free radical initiation throughout the course of the reaction.

I claim:

1. A process of preparing water soluble surface active alkane sulfonates comprising charging into a reaction vessel open to the atmosphere an aqueous solution of bisulfite, a solution of an olefin of seven to 20 carbon atoms or mixtures thereof in a saturated monohydric alcohol of one to four carbon atoms and a free radical-forming initiating catalyst selected from azobisisobutyronitrile, azobis ($\alpha,\gamma$-dimethylvaleronitrile) or diazoaminobenzene in an amount of about 0.01 to 1.0 percent based on the weight of the olefin, the concentration of the water and alcohol being such that a disperse system of two phases is initially provided, agitating the reaction mixture while raising its temperature slowly from room temperature to reflux as a maximum over a period of about 1 to 3 hours and thereafter maintaining said elevated temperature until the reaction mixture turns clear and water-white whereby the bilsulfite addition is completed and a reaction product is obtained which is utilizable as a water soluble surface active material without requiring further purification.

2. The process of claim 1 wherein the bisulfite is of the general formula $MHSO_3$ in which M is an alkali metal, an alkaline earth metal, ammonium or amine.

3. The process of claim 2 wherein the olefin is a $C_{15}-C_{18}$ mixture having an average molecular weight = 228, a composition of alpha olefins = 89 wt %, internal olefins 7 wt %, diolefins = 2 wt %, saturates = 2 wt % and a carbon distribution of $C_{14}$ = 1 wt %, $C_{15}$ = 27 wt %, $C_{16}$ = 29 wt %, $C_{17}$ = 28 wt %, $C_{18}$ = 14 wt % and $C_{19}$ = 1 wt %.

4. The process of claim 2 wherein the olefin is a $C_{11}-C_{14}$ mixture having an average molecular weight = 176, a composition of alpha olefins = 92 wt %, diolefins = 4 wt %, internal olefins = 3 wt %, saturates = 2 wt %, and a carbon distribution of $C_{10}$ = 2 wt %, $C_{11}$ = 23 wt %, $C_{12}$ = 23 wt %, $C_{13}$ = 24 wt %, $C_{14}$ = 25 wt % and $C_{15}$ = 3 wt %.

5. The process of claim 2 wherein the olefin is tetradecene, a $C_{14}$ product comprised of normal olefins = 92.6 wt % minimum, monoolefins = 98.5 wt % minimum, $C_{14}$ = 96 wt % minimum and a distillation range of 5% at 240° C and 95% at 255° C.

6. The process of claim 2 wherein the olefin is hexadecene, a $C_{16}$ product comprised of normal olefins = 90.6 wt % minimum, monoolefins = 98.5 wt % minimum, $C_{16}$ = 95 wt % and a distillation range of 5% at 270° C and 95% at 300°.

7. The process of claim 2 wherein the olefin is octadecene, a $C_{18}$ product comprised of normal olefins = 88.6 wt % minimum, monoolefins = 98.5 wt % minimum, $C_{18}$ = 90.4 wt % minimum and a freezing point of 18° C.

8. The product produced by the process of claim 1.
9. The product produced by the process of claim 2.
10. The product produced by the process of claim 3.
11. The product produced by the process of claim 4.
12. The product produced by the process of claim 5.
13. The product produced by the process of claim 6.
14. The product produced by the process of claim 7.
15. The process of claim 1 wherein the catalyst is azobisisobutyronitrile.
16. The process of claim 1 wherein the catalyst is azobis ($\alpha,\gamma$-dimethylvaleronitrile).
17. The process of claim 1 wherein the catalyst is diazoaminobenzene.
18. A process of preparing water soluble surface active alkane sulfonates comprising charging into a reaction vessel open to the atmosphere an aqueous solution of bisulfite, a solution of an olefin of seven to 20 carbon atoms or mixtures thereof in a saturated monohydric alcohol of one to four carbon atoms and a free radical-forming initiating catalyst in an amount of about 0.01 to 1.0 percent based on the weight of the olefin, the concentration of the water and alcohol being such that a disperse system of two phases is initially provided, agitating the reaction mixture while raising its temperature slowly from room temperature to reflux as a maximum over a period of about 1 to 3 hours and thereafter maintaining said elevated temperature until the reaction mixture turns clear and water-white whereby the bisulfite addition is completed and a reaction product is obtained which is utilizable as a water soluble surface active material without requiring further purification.

* * * * *